Sept. 12, 1944. A. T. McFADYEN 2,358,173

GLARE SHIELD

Filed Aug. 4, 1941 2 Sheets-Sheet 1

Inventor
Alexander T. McFadyen
By Liverance and Van Antwerp
Attorneys

Sept. 12, 1944.  A. T. McFADYEN  2,358,173
GLARE SHIELD
Filed Aug. 4, 1941  2 Sheets-Sheet 2

Inventor
Alexander T. McFadyen
By Liverance and Van Antwerp
Attorneys

Patented Sept. 12, 1944

2,358,173

UNITED STATES PATENT OFFICE 2,358,173

GLARE SHIELD

Alexander T. McFadyen, Grand Rapids, Mich.

Application August 4, 1941, Serial No. 405,289

15 Claims. (Cl. 296—97)

This invention relates to glare shields especially intended for automobiles and its particular object is to provide a device of this nature which will dim or completely block bright light from the eyes of the occupants of the vehicle and particularly the driver thereof.

The device comprises a carrier having arcuate tracks in which are slidably mounted translucent and opaque flexible shields. The carrier is mounted near the top and front of the vehicle body and its arcuate tracks are shaped to guide the flexible shields around the corner formed by the front and top of the body and the projecting portions of the shields will lie either close to the top or adjacent the front transparent windshield, said flexible shields being sufficiently resilient to assume a flat plane position in their portions projecting from the carrier.

The carrier may be mounted on pivots so that it may be swung from the position above the windshield to a position above the window in a side door of the body and also rotated so that the projected portions of the shields may be lowered adjacent said door window or extended adjacent the top.

The device is provided with various novel features of construction and arrangement as hereinafter more fully described and particularly pointed out in the claims, reference being had to the accompanying drawings, in which:

Like reference numbers refer to like parts in all the figures.

Figure 1:
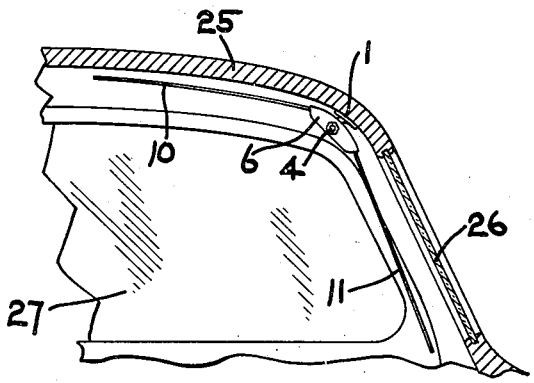
Fig. 1 is a fragmentary sectional elevation of the front upper portion of an automobile body showing the device embodying this invention in position therein.
Figure 2:
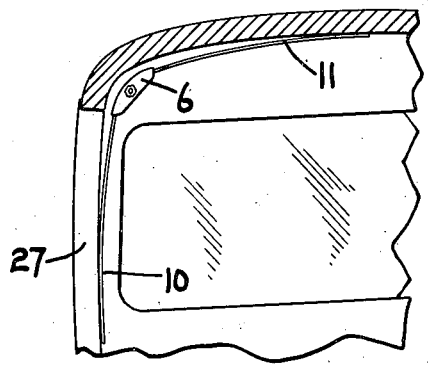
Fig. 2 is a fragmentary sectional elevation of the upper side portion of the body showing the glare shield swung to a position opposite the side door.

Referring to the structure illustrated in Figs. 3, 4 and 5, 1 is a bracket attached to the vehicle body and provided with an elbow 2 mounted to pivot on a vertical axis and frictionally retained in its pivoted positions by the spring 3. 4 is a horizontal rod extending into the elbow 2 and mounted to rotate on a horizontal axis. 5 is a clamping screw to exert frictional resistance upon said rod 4.

At opposite ends of the rod 4 are located the carrier end members 6 rigidly clamped to the rod 4 by nuts 7 and each end member 6 is provided with two inwardly facing adjacent arcuate channels or tracks 8.

One of the glare shields 10 is preferably opaque and the other one 11 is translucent and either may be moved to operative position as desired. The respective longitudinal edges of the shields 10 and 11 are preferably stiffened by spring steel bands 12 which are attached to the shields in a suitable manner and these stiffened edges of the shields ride in the tracks 8 of the respective end members 6. Although the shields so stiffened by the spring bands 12 are sufficiently flexible to curve and conform to the shape of the arcuate tracks 8, those portions of the shields which project from the tracks are resilient and stiff enough to assume flat plane positions.

In operation the device is mounted in the corner or bend formed by the junction of the body top 25 and front in which the conventional glass windshield 26 is located, the bracket 1 being attached near a side door 27 in which is a window. When so located either or both of the shields 10 and 11 may be pulled downwardly to the extent desired adjacent the windshield 26 sliding around the corner or bend in the body in the arcuate tracks 8. These shields may be lowered to any extent desired and the remaining portions projecting from the carrier will lie adjacent the top 25. When it is not desired to use the device the forward portions may be raised to their fullest extent which will project substantially the entire parts of the shields adjacent the top and out of the occupant's way.

If it is desired to shield light coming from the side through the window in the door 27 the free end of the carrier is swung rotating the elbow 2 on its vertical pivot in the bracket 1 to a position adjacent and above the door 27. In this movement the carrier must also be rotated on its horizontal axis on which the rod 4 is mounted in the elbow 2 which will move those projecting portions of the shields 10 and 11 which had previously been adjacent the top to a substantially vertical position adjacent the door 27 and those portions which had previously projected adjacent the windshield will then lie adjacent the top. When the carrier is moved to this position either or both of the shields may be raised or lowered the same as it was in the previous position adjacent the windshield.

Figure 10:
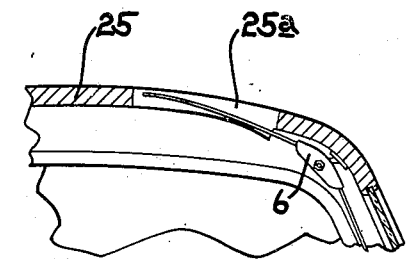
Fig. 10 is a fragmentary sectional elevation of the forward upper part of an automobile body illustrating the manner in which the projecting portions of the shields may be concealed within the top structure.

If desired the body top 25 may be provided with an opening 25a (Fig. 10) to receive and conceal those unused projecting portions of the shields which are adjacent the top.

Figure 6:
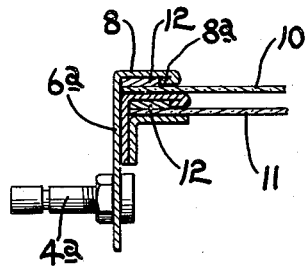
Fig. 6 is a fragmentary sectional elevation of the carrier portion of the modified structure shown in Fig. 7.
Figure 7:
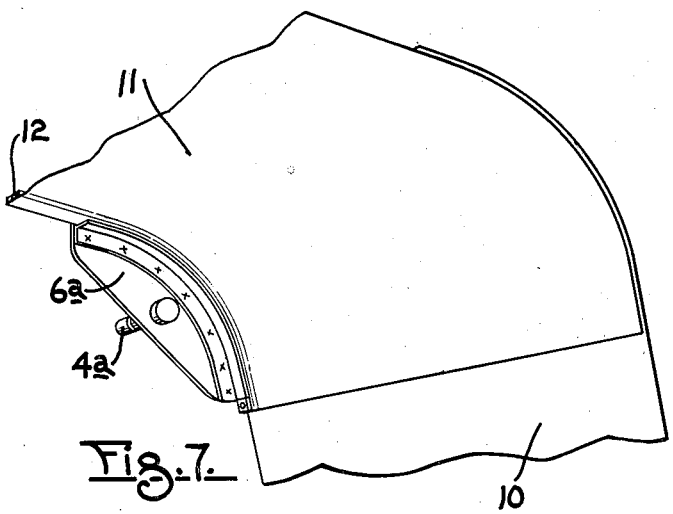
Fig. 7 is a perspective view with parts of the shields broken away, of a modified structure having tracks at one side only of the shields.

The modification illustrated in Figs. 6 and 7 is a simplified form in which only one end member 6a of the carrier is used and in this form the shields 10 and 11 are sufficiently resilient to sustain the weight of the projecting portions by being supported at one edge only. The end member 6a is carried by a stub shaft 4a and is inserted in the elbow 2 and provides the horizontal rotatable support.

In this form a side wall of each channel or track 8 is turned backward upon itself at 8a to serve as a retaining ledge which engages a side edge of the steel band 12 within the channel and retains it in place therein.

Figure 3:
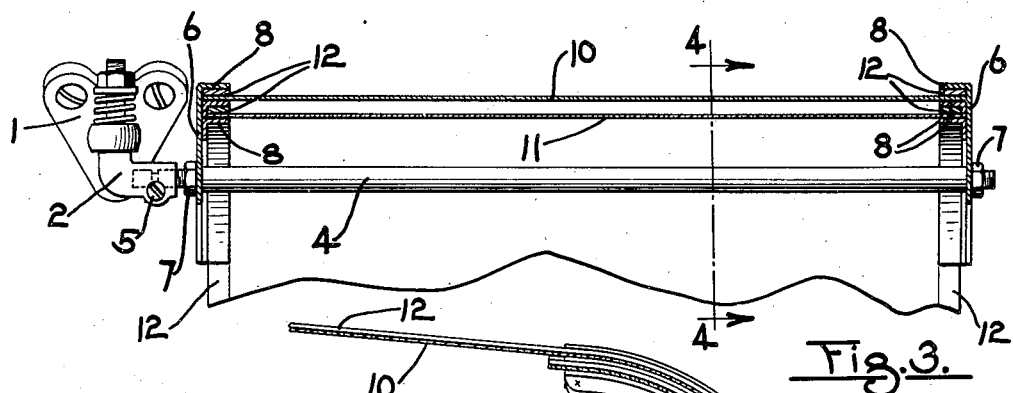
Fig. 3 is a longitudinal sectional elevation of the device on the line 3—3 of Fig. 5.
Figure 4:
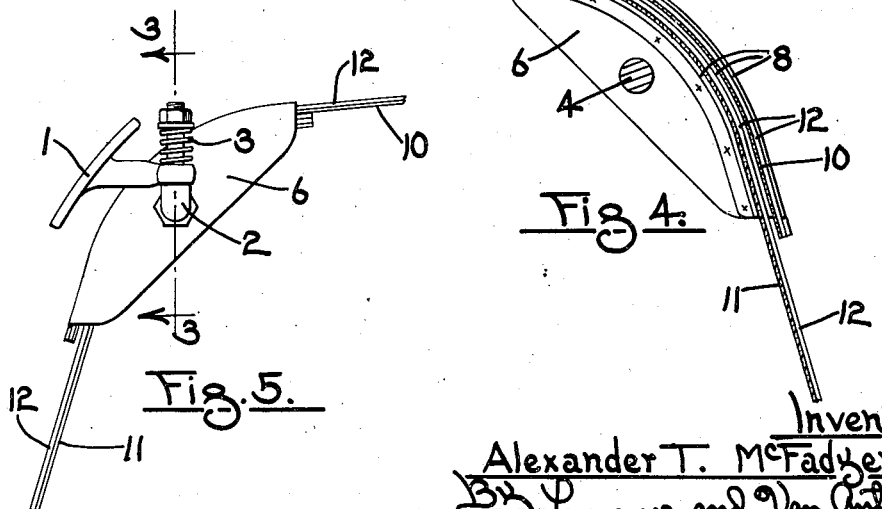
Fig. 4 is a transverse sectional elevation of the device on the line 4—4 of Fig. 3.
Figure 5:
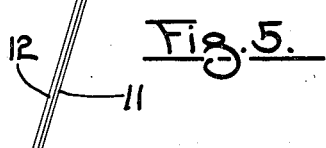
Fig. 5 is an end view of the device.

The operation of this form of structure is identical with that heretofore described for the structure illustrated in Figs. 3, 4 and 5.

Figure 8:
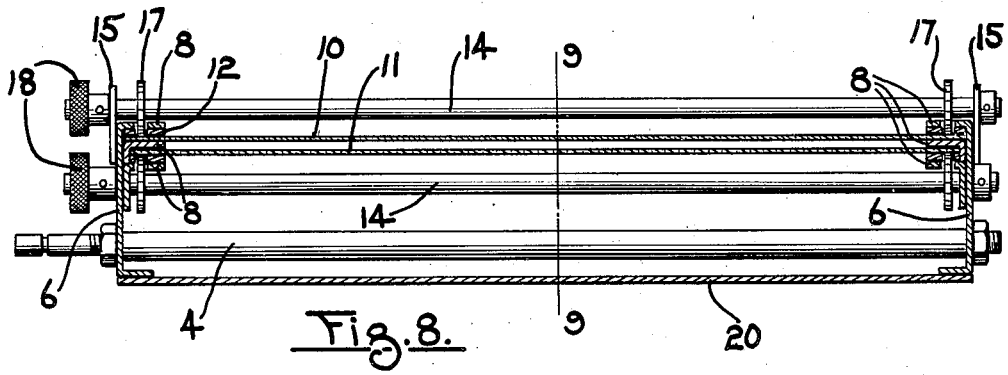
Fig. 8 is a longitudinal sectional elevation of a second modified structure on the line 8—8 of Fig. 9.
Figure 9:
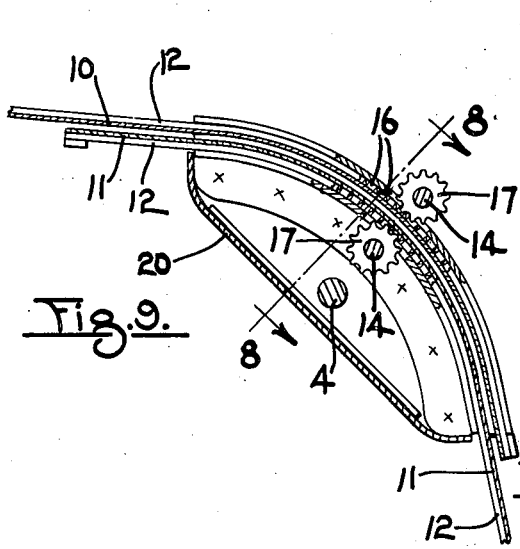
Fig. 9 is a transverse sectional elevation of the structure shown in Fig. 8 taken on the line 9—9 of Fig. 8.

The modified structure illustrated in Figs. 8 and 9 is in general the same as that of Figs. 3, 4 and 5 having the supporting rod 4 which is rotatably inserted into the elbow 2, the end members 6 with the tracks 8 and the shields 10 and 11 having their edges reinforced by the steel bands 12 which ride in the tracks 8. This structure is also provided with an operating and equalizing device for each shield comprising a rotatable shaft 14 extending entirely across the device and mounted in bearings 15 at its respective ends. The steel stiffening bands 12 are provided throughout their lengths with closely spaced openings 16 which provide racks in which gears 17 mesh. These gears are fixed near the respective ends of the shaft 14.

Knobs 18 are provided on each shaft 14 by means of which the shafts may be manually rotated which will move the shields 10 and 11 in their respective tracks 8. This structure also insures the uniform movement of each edge of the shield so that it will not pinch or bind in the tracks when it is moved.

This structure is also provided with a plate 20 extending between the respective end members 6 and rigidly attached thereto. This plate serves to strengthen and rigidify the structure and also forms a cover plate which conceals the interior of the device and adds to its appearance. When the plate 20 is provided it is conceived that that portion of the rod 4 extending between the end members may be eliminated depending entirely upon the plate 20 to connect them and hold them in their proper positions.

The operation of this form of structure is identical with that described for the structures of Figs. 3, 4 and 5 excepting that if desired the adjustment of the shields may be made by manually turning the knobs 18 on the shafts 14. When the shields are moved in the tracks 7 the gears 17 travel in the racks formed by the holes 16 in the bands 12 and cause simultaneous movement of the respective edges of the shields and keep them in proper alinement.

The degree of transparency of either or both of the shields is a matter of choice and the term translucent as used herein is to be interpreted in its broadest sense as meaning any degree of transparency less than clear.

It is of course evident that it is not necessary to use two shields but if desired only one may be provided and that may be either opaque or translucent as desired.

It is also apparent that the carrier may be rigidly fixed in the position above the windshield 26 by suitable brackets (not shown) if it is not desired to swing it to a position where it may be used opposite the side door.

The invention is defined in the appended claims and is to be considered comprehensive of all forms of structure coming within their scope.

I claim:

1. A glare shield comprising a carrier having a relatively short arcuate track and a flexible light shield mounted in said track for sliding movement therein and projectible from either end of said track said light shield being considerably longer than said track and always projecting from an end thereof.

2. The elements in combination defined in claim 1 in which said light shield is sufficiently resilient to assume a substantially plane shape in that portion which projects from said track.

3. The elements defined in claim 1 combined with means for mounting said carrier for rotation on both a substantially vertical axis and on a substantially horizontal axis.

4. The combination of a vehicle body having a front transparent windshield and transparent side window, of a glare shield comprising a carrier having an arcuate track, a flexible light shield mounted in said arcuate track for sliding movement therein and to project from either side of said carrier, means for mounting said carrier to be swung on a substantially vertical pivot from a position adjacent said windshield to a position adjacent said side window and means for mounting said carrier for rotation on a substantially horizontal axis.

5. The elements in combination defined in claim 4, in which said flexible light shield is sufficiently resilient to assume a substantially plane shape in those portions which project from said carrier.

6. The elements in combination defined in claim 4, combined with means for stiffening said light shield whereby those portions thereof which project from said carrier will assume a substantially plane shape.

7. A glare shield comprising a carrier having an arcuate track, a flexible light shield longer than said track, a flexible stiffening element attached to an edge of said light shield, said stiffening element and said edge of the light shield being mounted in said track for sliding movement therein and projectible from each end thereof and means for maintaining said stiffening element and said edge of the shield within said track.

8. The elements in combination defined in claim 7, combined with means for mounting said carrier to rotate both on a substantially vertical axis and a substantially horizontal axis.

9. A glare shield comprising a carrier having two spaced apart end members, a relatively short arcuate track on each of said end members, a flexible light shield having its respective opposite edges mounted in said arcuate tracks for sliding movement therein and to project from either end thereof said light shield being considerably longer than said track and always projecting from an end thereof.

10. The elements in combination defined in claim 9, combined with means for mounting said carrier for pivotal movement on both a substantially vertical axis and substantially horizontal axis.

11. The elements defined in claim 9 combined with means for causing both respective edges of said light shield to move simultaneously in said tracks.

12. The elements in combination defined in claim 9 combined with manually operable means for simultaneously moving both respective edges of said light shield in said arcuate tracks.

13. The elements in combination defined in claim 9 combined with manually operable means for simultaneously moving both respective edges of said light shield in said arcuate tracks, and means for mounting said carrier for pivotal movement on both a substantially vertical axis and on a substantially horizontal axis.

14. A glare shield comprising a carrier having spaced apart end members, an arcuate track on each of said end members, a flexible light shield having its respective edges mounted in said arcuate tracks for sliding movement therein and to project therefrom, members having rack teeth attached adjacent each respective edge of said light shield, a shaft rotatably mounted on said carrier and two gears fixed to said shaft and each respectively meshing with the rack teeth at the respective edges of said light shield.

15. The combination with a vehicle body having a front transparent windshield and a top provided with a light shield receiving chamber, of a glare shield comprising a body having an arcuate track, means for mounting said body adjacent said windshield and adjacent said chamber and a flexible light shield mounted in said arcuate track for slidable movement therein and projectible from said carrier both to a position adjacent said windshield and to a position within said chamber.

ALEXANDER T. McFADYEN.